March 15, 1955 S. L. BROADHEAD, JR 2,704,324
SQUELCH CIRCUIT
Filed April 12, 1954
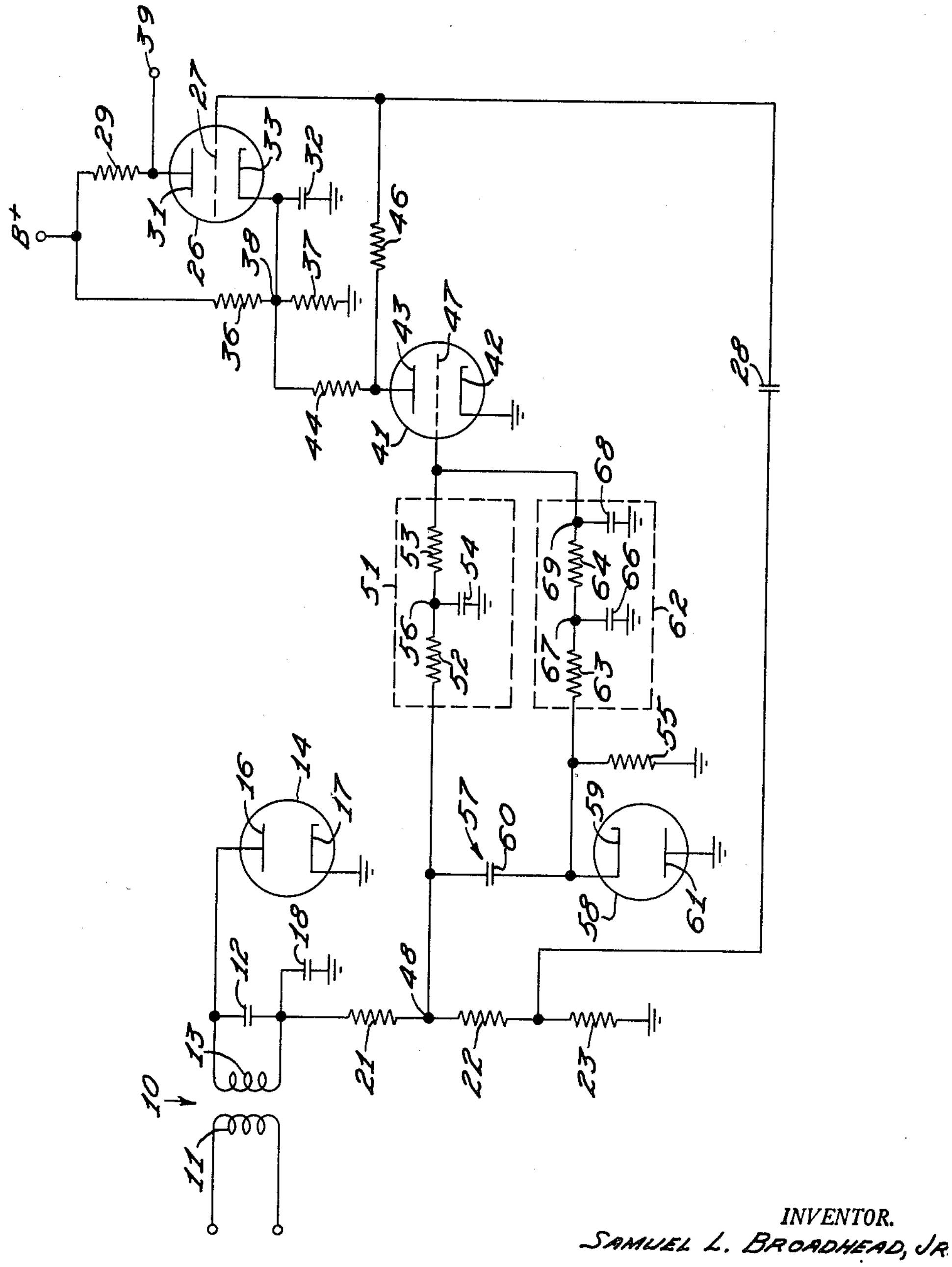
INVENTOR.
SAMUEL L. BROADHEAD, JR
BY Marvin Moody
ATTORNEY United States Patent Office 2,704,324

Patented Mar. 15, 1955

2,704,324

SQUELCH CIRCUIT

Samuel L. Broadhead, Jr., Cedar Rapids, Iowa, assignor to Collins Radio Company, Cedar Rapids, Iowa, a corporation of Iowa Application April 12, 1954, Serial No. 422,387

5 Claims. (Cl. 250—20)

This invention relates to a squelch circuit which provides improved means for disabling the output of a receiving system when the noise in the system becomes large in relation to the signal.

A squelch circuit may be defined as a circuit which disables the output of a receiving system either when there is no signal or when noise exceeds a predetermined relationship with signal. Noise is generally a limiting factor in radio reception and becomes critical when it is sufficiently large to prevent discernment of transmitted intelligence.

Conventionally, squelch circuits are concerned primarily with disabling the output of a receiver when no signal is received and are concerned only secondarily with disabling the output when an unintelligible signal is received. The conventional squelch circuit generally used in amplitude modulated receivers disables the output of a receiver when the amplitude of the signal is below a predetermined value, called herein the "squelch level," which is generally chosen as a compromise between average noise amplitude, on the one hand, and receiver sensitivity, on the other hand. Furthermore, noise, which at times exceeds the squelch level while no signal is being received, may actuate the conventional system to enable reception of the noise.

It is therefore an object of this invention to provide a squelch circuit which maintains a receiver in a disabled state during periods of operation without signal, regardless of the amount of received noise.

It is another object of this invention to provide a squelch circuit which disables a receiver while signal is being received, when noise becomes sufficiently large in proportion to signal to make the output of the receiver unintelligible.

It is still another object of this invention to provide a squelch circuit that automatically enables reception when the signal to noise ratio becomes sufficiently large to allow discernment of intelligence.

It is a further object of this invention to provide a squelch circuit that also acts to suppress noise when its amplitude exceeds a predetermined relationship with signal.

A principle used by the invention is that, when noise becomes prominent in proportion to signal, the noise provides relatively large alternating components that have amplitudes which often exceed the intelligence components in the signal when modulated 100 percent. The invention detects the alternating components of noise which exceed the 100 percent modulation level and uses them to disable reception. The direct component in the detected signal is proportional to the 100 percent modulation level and is used by the invention to determine when noise exceeds the 100 percent modulation level.

When no signal is received, the invention maintains a receiver in a disabled state without regard to the reception of high amplitude noise. In such case, the squelch level is automatically adjusted by the invention to a value greater than the noise level. Accordingly, sudden changes in noise level immediately cause changes in squelch level to maintain the receiver disabled while no signal is being received.

When signal is being received, the invention controls reception by means of the signal to noise ratio. It enables reception while the signal to noise ratio is above a predetermined value and disables reception when the ratio falls below that value. The predetermined value is controlled by the parameters of the invention and may be adjusted to operate at any signal to noise ratio greater than one.

Further objects, advantages and features of the invention will be apparent to a person skilled in the art upon further study of the specification and drawing, in which the figure is a schematic diagram of a chosen embodiment of the invention.

Now referring specifically to the figure, a transformer 10 has a primary 11 connected to a source of intermittent radio frequency signal which might be the output of an intermediate frequency amplifier in a radio receiver, and a capacitor 12 is connected across secondary 13 of transformer 10. The plate 16 of a detector diode 14 is connected to one side of secondary 13 and its cathode 17 is connected to ground. A second capacitor 18 is connected between the other side of secondary 13 and ground. Three resistors 21, 22 and 23 are connected in series across capacitor 18.

An audio amplifier tube 26 has its control grid 27 connected to the ungrounded side of resistor 23 by means of a blocking condenser 28. A load resistor 29 is connected between the plate 31 of tube 26 and a B plus power supply, and a bypass capacitor 32 is connected between the cathode 33 of tube 26 and ground. A pair of resistors 36 and 37 are connected in series between the B plus power supply and ground, and their intermediate point 38 is connected to the cathode 33. The audio output of tube 26 is taken from terminal 39 which is connected to plate 31.

The cathode 42 of a squelch tube 41 is connected to ground and its plate 43 is connected to one side of a resistor 44 which has its other side connected to point 38. Another resistor 46 is connected between plate 43 of squelch tube 41 and grid 27 of amplifier tube 26.

A first filter 51 which passes substantially direct current is connected on one side to grid 47 to squelch tube 41 and is connected on the other side to point 48 located between resistors 21 and 22. Filter 51 comprises: a pair of resistors 52 and 53, connected in series between point 48 and grid 47, and a capacitor 54 connected between ground and intermediate point 56 located between resistors 52 and 53.

One side of a capacitor 57 is also connected to point 48. The cathode 59 of a unidirectional conductor or diode 58 is connected to the other side of capacitor 57 and the plate 61 of diode 58 is connected to ground. A large resistor 55 is connected in parallel with a diode 58.

A second filter 62 which passes substantially directed current is connected between cathode 59 of diode 58 and grid 47 of squelch tube 41. Filter 62 comprises: a pair of resistors 63 and 64 connected in series between cathode 59 and grid 47, a first capacitor 66 connected between point 67 and ground, and a second capacitor 68 connected between point 69 and ground.

Generally, in regard to squelch circuits, there are three basic conditions of operation for a radio receiver. First, there is operation when no signal is received—as is often necessary in communication work during periods between signals; second, there is operation when a small signal is received that is made generally unintelligible by noise; and third, there is operation when signal is generally intelligible over noise. During any condition of operation, noise generated by heterogeneous means within and without the receiver may be a factor in its output.

When there is no signal, only noise can comprise the output; and when noise predominates over signal, the noise makes the output unintelligible. In either case, the output of the receiver serves no useful purpose and fatigues the person operating the receiver. Accordingly, it is desirable to silence the output of a receiver during such periods, and that is the primary function of this invention.

If neither signal nor noise is received by transformer 10 during receiver operation, amplifier 26 is disabled in the following manner: The voltage at point 48 remains at ground potential, since there is no current flowing through resistors 21, 22 and 23; and grid 47, which is connected to point 48 through resistors 52 and 53, is also at ground potential—which is above cutoff bias for squelch tube 41, and it conducts. Therefore, a large voltage drop occurs across plate resistor 44, due to the plate current of squelch tube 41, and the voltage at plate 43 is negative with respect to the voltage at point 38. Amplifier 26 therefore is driven below cutoff, since the voltage on cathode 33 is the voltage at point 38, and since the voltage on grid 27 is at the more negative voltage of plate 43. Accordingly, the output of amplifier 26 is disabled when squelch tube 41 is conducting and is enabled when squelch tube 41 is nonconducting.

However, when no signal is received during receiver operation, noise generally will be transmitted from the intermediate frequency amplifier to transformer 10, and the noise will be detected by diode 14. Hence, a direct voltage component of the noise appears with negative polarity across series resistors 21, 22 and 23 due to the polarity of diode 14; and audio and super-audio components of noise are superimposed on the negative direct component. Radio frequency components are bypassed to ground by capacitor 18.

Substantially all alternating components are blocked by filter 51 from reaching grid 47 of squelch tube 41, but the negative direct component passes through filter 51 and bias squelch tube grid 41. The negative direct component of noise tends to bias squelch tube 41 toward cutoff; which, if reached, would enable amplifier 26 to provide an output of noise. However, the invention prevents this from occurring and causes amplifier 26 to remain disabled regardless of the amount of received noise.

Noise generally varies greatly and is detected as a voltage which is modulated many hundred percent. Therefore, its detected alternating components are much greater in amplitude than its detectd direct component. The alternating components of noise pass through capacitor 57 and diode 58 to charge the lower plate 60 of capacitor 57 to a positive direct voltage which appears across resistor 55 and which has an amplitude approximately equal to the voltage peaks of the alternating noise components.

The filter resistors 52, 53, 64 and 63 form a direct current voltage divider between point 48 and resistor 55. The negative direct voltage component is applied at the end connected to point 48, and the positive direct voltage is applied at the end connected to resistor 55. The resistors are chosen so that the intermediate point to which grid 47 is connected remains above cutoff for tube 41 as the voltage at the ends of the divider are swung upwardly and downwardly by the action of the noise. When no signal is received the predominant alternating components in the noise cause the positive voltage end of the divider to predominate and the potential on grid 47 remains above cutoff, regardless of the amount of noise received by transformer 10, and amplifier 26 remains disabled.

When a signal is received which is large in comparison to noise, it is likewise detected by diode 14. The radio frequency components are shunted to ground by condenser 18, but the direct voltage component and alternating intelligence components are presented across resistors 21, 22 and 23.

The direct component of signal is proportional to the carrier voltage and is greater than its alternating components, even at 100 percent modulation. Accordingly, the voltage divider comprising resistors 52, 53, 64 and 63 is driven more negative at point 48 by the direct component of signal than it is driven positive at the other end by the relatively small alternating components of signal. As a result, squelch grid 47 is driven below cutoff, and amplifier 26 is thus enabled to provide an output when signal is large in comparison to noise.

However, if either the signal or noise level changes and the noise becomes large in proportion to signal, the large alternating components of the noise will predominate and charge capacitor 57 to a larger positive voltage. The voltage at grid 47 accordingly rises above cutoff, and squelch tube 47 conducts to disable amplifier 26. In this manner, the circuit automatically adjusts its squelch level according to the relative amounts of signal and noise; or in other words, the invention squelches the output of a receiver according to the signal to noise ratio.

The values of resistors 53, 54, 63 and 64 determine the signal to noise ratio that squelches the output of the receiver. The selected ratio may be any number greater than one.

By selecting components with small time constants, the circuit can be made responsive to extremely short bursts of noise.

It is therefore seen that this invention provides a squelch circuit which disables the output of a receiver both when no signal is received and when an unintelligible signal is received. It is further seen that the invention prohibits enablement of the amplifier when large amounts of noise are received during periods of no signal and, during reception of signal, suppresses intermittent large noise pulses by momentarily disabling receiver output for their duration.

While a specific embodiment of the invention has been described, various changes and modifications will be obvious to those skilled in the art which do not depart from the spirit and scope of the invention.

I claim:

1. A squelch circuit for receivers of amplitude modulated signals comprising, an input transformer connected to the radio frequency signal source in said receiver, a detector tube with its cathode grounded and its plate connected to one side of the secondary of said transformer, a first capacitor connected across said secondary, a second capacitor with one end grounded and the other end connected to the other side of said secondary, a plurality of resistors connected in series across said second capacitor, an amplifier tube, a third capacitor connected between the control grid of said amplifier tube and an intermediate point on said plurality of resistors, a fourth capacitor connected between ground and the cathode of said amplifier tube, a load resistor connected between the plate of said amplifier tube and a B plus power supply, an output terminal connected to plate of said amplifier tube, a pair of resistors connected in series between ground and the B plus power supply, an intermediate point on said pair of resistors connected to the cathode of said amplifier to bias it, a squelch tube with its cathode grounded, a plate resistor connected between the plate of said squelch tube and the intermediate point of said pair of resistors, an isolating resistor connected between the plate of said squelch tube and the control grid of said amplifier tube, a fifth capacitor with one side connected to an intermediate point on said plurality of resistors, a diode with its cathode connected to the other side of said fifth capacitor and its plate connected to ground, a large resistor connected in parallel with said diode, a first direct current filter comprising, first and second resistors connected serially between the cathode of said diode and the control grid of said squelch tube, and a pair of capacitors connected in shunt at opposite ends of said second resistor, a second direct current filter comprising third and fourth resistors connected serially between the control grid of said squelch tube and an intermediate point on said plurality of resistors, and a capacitor connected between said third and fourth resistors and ground.

2. A squelch circuit for disabling the output of a radio receiver comprising, a detector tube connected to a radio frequency source in said receiver, resistor means connected in series with said detector tube to receive the negative components of the demodulated signal, capacitor means connected across said resistor means to filter out the radio frequency components in the detected signal, an amplifier tube, a blocking capacitor connected between the control grid of said amplifier tube and an intermediate point on said resistor means, biasing means connected to said amplifier tube, a squelch tube wtih its cathode connected to ground, a squelch resistor connected in series with said squelch tube, between its plate and the cathode of said amplifier tube, an isolating resistor connected at one end to the grid of said amplifier tube and at the other end to the plate of said squelch tube, a rectifying capacitor connected at one end to said resistor means, a diode with its cathode connected to the other end of said rectifying capacitor and its plate connected to ground, a resistor connected across said diode, a first filter passing substantially direct current connected on one side to the control grid of said squelch tube and on the other side to one end of said rectifying capacitor, a second filter passing substantially direct current connected on one side to the control grid of said squelch tube and connected on the other side to the other end of said rectifying capacitor from said first filter.

3. A squelch circuit for disabling an amplifier of amplitude modulated signals when noise becomes predominant in relation to signal comprising, a detector connected to the radio frequency signal source in said receiver, resistor means connected to receive the signal output of said detector, an amplifier, a blocking capacitor connected between the control grid of said amplifier tube and an intermediate point on said resistor means, squelch tube means connected to said amplifier to enable and disable said amplifier tube by squelch tube nonconduction and conduction respectively, a first filter passing substantially direct current connected between the control grid of said squelch tube and an intermediate point on said resistor means, a rectifying capacitor connected on one end to an intermediate point on said resistor means, unidirectional conduction means with its negative side connected to the other end of said capacitor and its positive side connected to ground, a large resistor connected in parallel with said unidirectional conducting means, a second filter passing substantially direct current connected between the negative side of said unidirectional conductor and the control grid of said squelch tube.

4. A squelch circuit which disables the output of a receiver when there is no signal being received and where there is a signal which is made unintelligible by noise comprising, detector means connected in said receiver to demodulate the signal, resistor means connected to said detector means to receive the demodulated output with negative polarity, an amplifier connected to said resistor means to amplify the demodulated output, a squelch tube connected to said amplifier to disable said amplifier tube when said squelch tube conducts, a capacitor with one end connected to said resistor means, a diode with its cathode connected to the other end of said capacitor and its plate connected to ground, a resistor connected in parallel with said diode, a first direct current filter connected on one side to the control grid of said squelch tube and connected on the other side to one end of said capacitor, a second direct current filter with one side connected to the control grid of said squelch tube and the other side connected to the opposite end of said capacitor.

5. Means for controlling a squelch tube in receivers which have detector means for amplitude modulated signals comprising, resistor means connected in said detector means to receive the demodulated output of said detector means, a capacitor connected at one end to an intermediate point on said resistor means, a unidirectional conductor connected to ground on one side and connected on the other side to the other end of said capacitor, a first filter passing substantially direct current connected between the control grid of said squelch tube and one end of said capacitor, a second filter passing substantially direct current connected between the control grid of said squelch tube and the other end of said capacitor, and said unidirectional conductor connected with a polarity that charges said capacitor oppositely from the polarity of the direct voltage on said resistor means.

References Cited in the file of this patent

UNITED STATES PATENTS 2,543,523 Couillard ............ Feb. 27, 1951